(12) United States Patent
Heinrich et al.

(10) Patent No.: US 11,355,965 B2
(45) Date of Patent: Jun. 7, 2022

(54) DEVICE FOR INDUCTIVELY TRANSFERRING ELECTRICAL ENERGY AND/OR DATA

(71) Applicant: Balluff GmbH, Neuhausen a.d.F (DE)

(72) Inventors: Joerg Heinrich, Duerrlewang (DE); David Maier, Buehl (DE); Nejila Parspour, Gerlingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 260 days.

(21) Appl. No.: 16/817,775

(22) Filed: Mar. 13, 2020

(65) Prior Publication Data
US 2020/0295600 A1    Sep. 17, 2020

(30) Foreign Application Priority Data
Mar. 15, 2019  (DE) .................... 10 2019 106 719.7

(51) Int. Cl.
*H02J 50/10*   (2016.01)
*H01Q 7/00*   (2006.01)
*H01F 27/28*   (2006.01)

(52) U.S. Cl.
CPC ............... *H02J 50/10* (2016.02); *H01Q 7/00* (2013.01); *H01F 27/28* (2013.01)

(58) Field of Classification Search
CPC .......... H02J 50/10; H02J 50/402; H02J 50/12; H02J 50/40; H01Q 7/00; H01F 27/28; H01F 38/14; H01F 27/2804; H01F 27/306; H01F 2038/143
See application file for complete search history.

(56) References Cited

U.S. PATENT DOCUMENTS

| | | |
|---|---|---|
| 9,231,412 B2 | 1/2016 | Lisi et al. |
| 9,643,505 B2 | 5/2017 | Ichikawa et al. |
| 9,649,946 B2 | 5/2017 | Ichikawa et al. |
| 9,826,670 B2 | 11/2017 | Nakamura et al. |
| 10,554,115 B2 | 2/2020 | Mao |
| 2010/0314946 A1 | 12/2010 | Budde et al. |
| 2015/0054354 A1 | 2/2015 | Lemmens et al. |
| 2015/0236517 A1 | 8/2015 | Deguchi et al. |
| 2015/0276965 A1 | 10/2015 | Turki |

(Continued)

FOREIGN PATENT DOCUMENTS

| | | |
|---|---|---|
| DE | 20 2007 011 745 U1 | 12/2007 |
| DE | 20 2009 009 689 U1 | 11/2010 |

(Continued)

OTHER PUBLICATIONS

David Maier, Jörg Heinrich, Marco Zimmer, Marcel Maier, Nejila Parspour, "Contribution to the System Design of Contactless Energy Transfer Systems," IEEE Transactions on Industry Applications, vol. 55, No. 1, Jan./Feb. 2019, total of 11 pages (https://ieeexplore.ieee.org/document/8440726).

(Continued)

*Primary Examiner* — Seung H Lee
(74) *Attorney, Agent, or Firm* — Collard & Roe, P.C.

(57) ABSTRACT

A device for inductively transferring electrical energy and/or data from a primary-sided carrier to at least one secondary-sided recipient which can be positioned on the carrier has a meander-shaped winding on the primary side and at least one meander-shaped winding on the secondary side.

3 Claims, 5 Drawing Sheets

(56) References Cited

U.S. PATENT DOCUMENTS

2019/0325731 A1    10/2019  Gaggero et al.
2020/0195149 A1*   6/2020   Mayell .............. H02M 3/33507

FOREIGN PATENT DOCUMENTS

| DE | 10 2012 108 671 A1 | 5/2014 |
| DE | 11 2013 001 910 T5 | 12/2014 |
| DE | 10 2013 219 527 A1 | 4/2015 |
| DE | 11 2013 004 469 T5 | 5/2015 |
| DE | 11 2013 006 982 T5 | 4/2016 |
| DE | 10 2015 005 871 A1 | 1/2017 |
| DE | 10 2016 202 047 A1 | 8/2017 |
| DE | 10 2018 109 267 A1 | 10/2019 |
| EP | 2 428 969 B1 | 10/2016 |
| WO | 2016/078814 A1 | 5/2016 |

OTHER PUBLICATIONS

Marcel Maier, David Maier, Marco Zimmer, Nejila Parspour, "A Novel Self Oscillating Power Electronics for Contactless Energy Transfer and Frequency Shift Keying Modulation," International Symposium on Power Electronics, Electrical Drives, Automation and Motion (SPEEDAM), Anacapri, Italy, Jun. 2016, pp. 67-72, total of 6 pages.
German Office Action dated Jan. 8, 2020 in German Application No. 10 2019 106 716.2 with English translation of the relevant parts.
German Office Action dated Jan. 8, 2020 in German Application No. 10 2019 106 719.7 with English translation of the relevant parts.
German Office Action dated Jan. 13, 2020 in German Application No. 10 2019 106 720.0 with English translation of the relevant parts.

* cited by examiner

DEVICE FOR INDUCTIVELY TRANSFERRING ELECTRICAL ENERGY AND/OR DATA

CROSS REFERENCE TO RELATED APPLICATIONS

Applicant claims priority under 35 U.S.C. § 119 of German Application No. 10 2019 106 719.7 filed Mar. 15, 2019, the disclosure of which is incorporated by reference.

BACKGROUND OF THE INVENTION

1. Field of the Invention

The invention relates to a device for inductively transferring electrical energy and/or data.

2. Description of the Related Art

Devices for inductively transferring electrical energy are known from the prior art.

By way of example, a device for inductively transferring electrical energy from a stationary unit having at least one primary inductivity to a vehicle adjacent to this having at least one secondary inductivity emerges from DE 20 2009 009 689 U1. DE 10 2015 005 871 A1 describes a system for transferring energy in a contactless manner from an underground primary conductor to a vehicle which in particular is standing on the ground, wherein the vehicle has a secondary winding arrangement which can be inductively coupled to the primary conductor.

In the industrial sector, sensors and actuators are arranged on fastening elements, which are, for example, designed as so-called active rods, by means of which energy and/or data are transferred to sensors, for example, by means of an electromagnetic coupling method. Such a fastening element emerges from the non-prepublished application DE 10 2018 109 267.9 of the applicant.

In industrial application, it is advantageous when several sensors are arranged on a single fastening element, for example in the form of a rod, for example, of 70 cm in length and 8 cm in diameter. Here, the transfer of the energy can be implemented as a point-to-point system. With such a transfer as a point-to-point system, one power electronic unit must be provided on the primary side per recipient on the secondary side, for example, a sensor. A continuous positioning along the carrier, i.e. a rod, for example, is hereby not possible. Whether a rotatable positioning is possible depends on the rotational degree of freedom, which is determined by the design of the winding. Different kinds of winding are known, for example, windings in the shape of a circle/rectangle/solenoid.

Preferably, several sensors and/or actuators should be arranged to be able to be freely positionable and rotatable on such a rod. Here, the sensors and actuators must be supplied with electrical energy. In addition, a data transfer must take place.

It is the object of the invention to provide a device which allows sensors and actuators to be freely positioned on a fastening element, in particular on said rod, wherein an energy supply with electrical energy should occur inductively, thus not in a conductor-bound manner.

SUMMARY OF THE INVENTION

With a device for inductively transferring electrical energy and/or data with the features according to the invention, it is possible to freely position one or more secondary-sided recipients on a carrier. The inductive transfer of electrical energy here occurs very advantageously by means of at least one meander-shaped winding on the primary side and at least one meander-shaped winding on the secondary side.

Here, a particularly advantageous aspect of the invention provides that a plurality of meander-shaped windings are arranged on the secondary side offset to one another and mutually overlapping. In this way, multiple secondary-sided recipients can be positioned on the fastening element and supplied with energy at the same time.

Here, it is particularly advantageously provided that a compensation and rectifier circuit is assigned to every meander-shaped winding. In this way, the disadvantage of an energy transfer of a point-to-point system is avoided.

According to a further aspect of the invention, it is provided that all compensation and rectifier circuits are assigned to a single intermediate circuit.

Depending on the rotational position of the recipient, the windings are passed through differently by the magnetic field. Due to the geometrical structure, a winding will always have the highest induced voltage or the greatest magnetic coupling to the primary side. Since all compensation and rectifier circuits are assigned to a single intermediate circuit, this intermediate circuit is then fed from this winding, whereby an approximately constant energy transfer can take place. These meander-shaped windings and the assigned compensation and rectifier circuits each form recipients. A plurality of recipients can thereby be used. The more recipients are used, the more constant the energy transfer is, but the component expenditure also increases. A particularly advantageous embodiment provides three recipients with a 120° offset. Purely in principle, it is also possible to offset fluctuations with circuits known per se.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
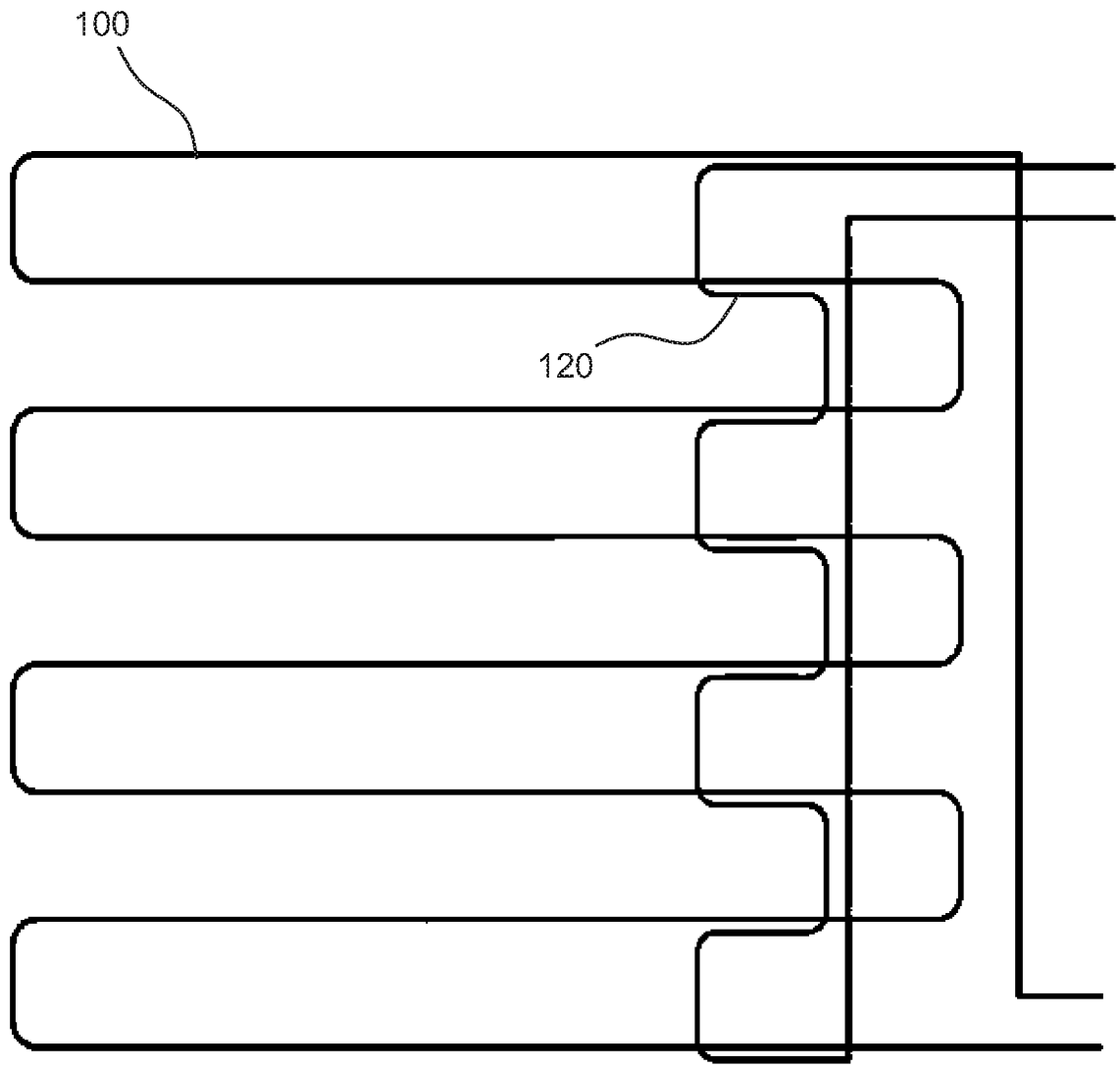
FIG. 1 shows primary-sided and secondary-sided windings for the energy transfer to recipients which can be positioned.

In FIG. 1, the inductive energy transfer to recipients which can be positioned is schematically depicted.

Energy is transferred inductively from a primary-sided meander-shaped winding 100 to a secondary-sided meander-shaped winding 120. The meander-shaped windings are arranged in light of the primary-sided winding as well as in light of the secondary-sided winding on a flexible carrier. By way of example, meander-shaped winding systems with the winding number 1 are depicted in FIG. 1. The distance from left to right thus corresponds to the length of a cylindrical rod and the distance from the top to the bottom corresponds to the length of the peripheral surface of the cylinder. The secondary-sided winding 120 can be shifted across the rod length, i.e. from left to right or from right to left in FIG. 1. In every position in the longitudinal direction, there is a sufficient coupling between the primary winding 100 and the secondary winding 120. In contrast, the coupling does not remain constant with a winding in the case of a rotation (in FIG. 1 from the top to the bottom). For this reason, the secondary-sided winding has to be carried out several times. In the following description, an arrangement with three secondary-sided windings is described. However, the number of the windings used is not restricted to three, but rather can, purely in principle, assume any desired number.

Figure 2:
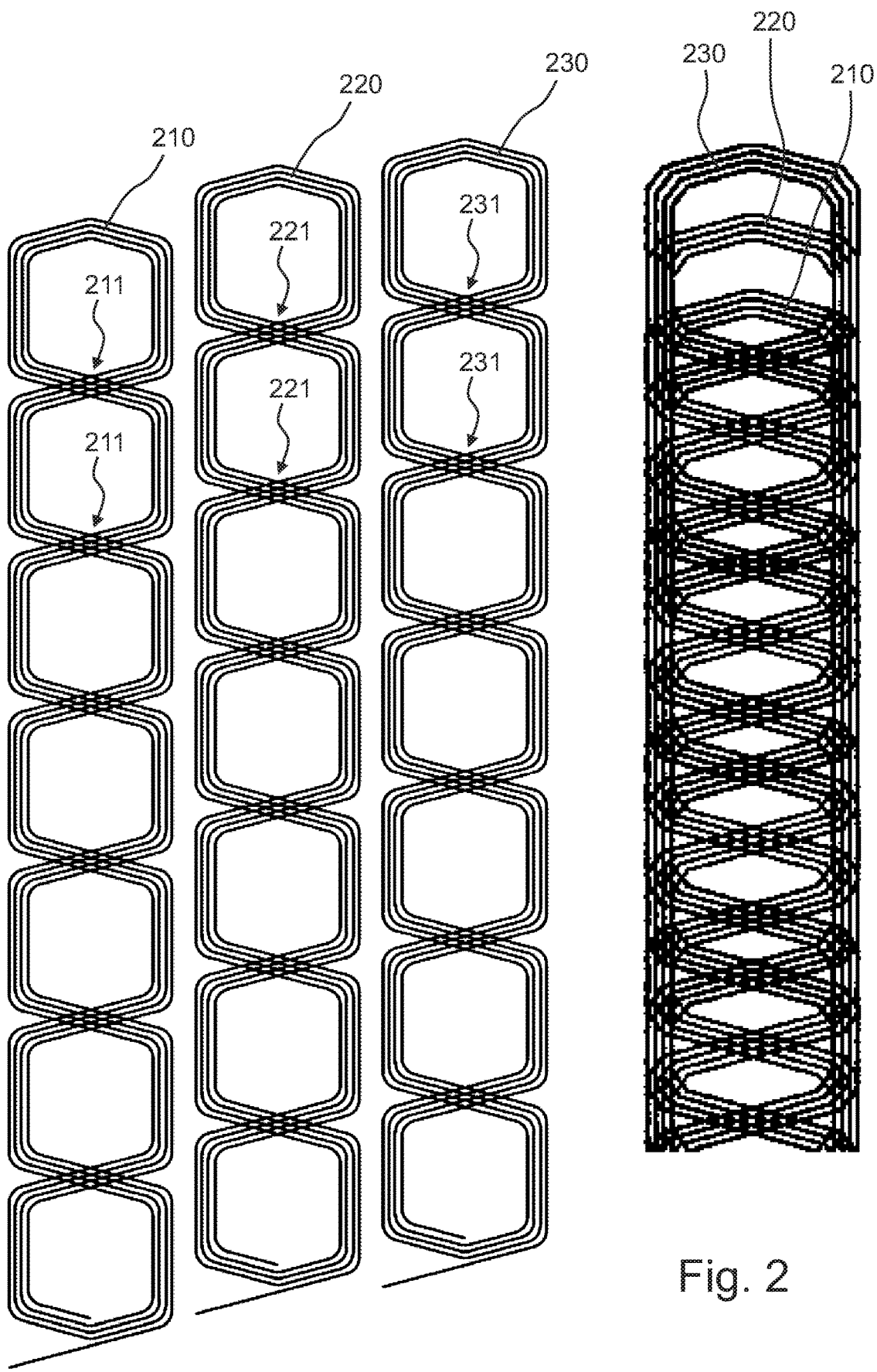
FIG. 2 shows schematically the winding of the secondary side, tripled and superimposed.

A secondary-sided winding in triplicate is depicted in FIG. 2. As is shown on the left in FIG. 2, three windings 210, 220, 230 are provided, which are arranged slightly offset to one another. These windings are applied by an embroidery machine onto at least one flexible carrier, for example. For each of the windings 210, 220, 230, a high frequency strand is embroidered.

The meander-shaped windings 210, 220, 230 are designed in such a way that crossovers 211, 221, 231 are always situated within straight courses of the strand. The embroidery process is chosen in such a way that a customary embroidery machine leaves these regions out during the embroidery process. The strand remains in place without additional insertions which are located in the region of the crossover. That minimizes the risk of damages to the strands during the embroidery process.

As a result of such damages to the strands, for example, severances, the coil quality of such windings decreases, which must be avoided.

After appropriate folding of the at least one flexible carrier, the windings are offset to one another and mutually overlap, as is depicted on the right side of FIG. 2.

It should be noted here that these windings are arranged as fastening elements in a peripheral direction of the cylinder-shaped rod when a cylinder-shaped rod is used.

The secondary-sided windings in triplicate depicted in FIG. 2, which overlap one another, enable the rotational degree of freedom. With three windings, as depicted in FIG. 2, a rotation about 360 degrees is achieved. This means that secondary-sided recipients can be arranged in any desired position on the cylinder-shaped rod which is not shown.

Figure 3:
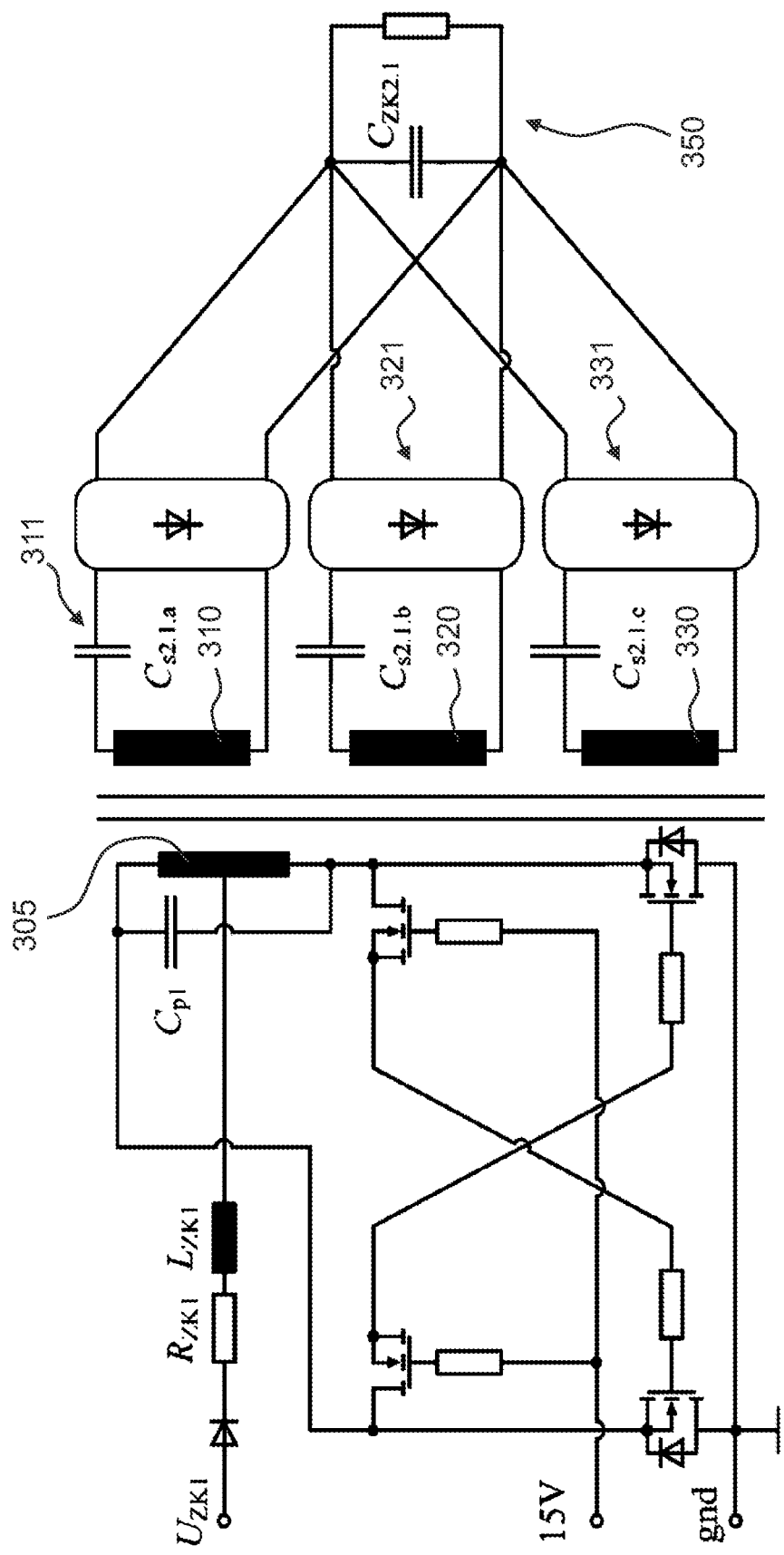
FIG. 3 shows a circuit with a recipient which has three windings.

In FIG. 3, a circuit is depicted which enables the inductive energy transfer with a winding scheme of this kind. The circuit substantially depicts an autoresonant Royer oscillator having serially compensated secondary sides.

A primary-sided inductivity 305 is faced by three secondary-sided inductivities 310, 320, 330, which represent the windings 210, 220, 230 (FIG. 2). On the secondary side, one compensation and rectifier circuit 311, 321, 331 is allocated to each winding 210 or 310, 220 or 320, 230 or 330. Depending on the rotational position of the recipient, the windings are passed through differently by the magnetic field. Due to the geometrical structure, the highest induced voltage will always occur in one winding or one winding will always have the greatest magnetic coupling to the primary side. An intermediate circuit 350 is then fed by this winding, whereby a constant energy transfer can take place.

The winding scheme and the circuit described above are explained by means of a fastening element in the form of a cylindrical rod.

It should be noted that the invention is not limited to a rod, but that the concept is, purely in principle, also conceivable in the surface.

The number of windings is also not limited to three, but it could also be only two or more than three, in particular n windings can be possible.

It should also be noted that the meander in FIG. 1 can also be rotated about 90 degrees without any loss of function being recorded. This means that the winding 100 depicted in FIG. 1 can not only be wound longitudinally to the peripheral surface of the rod but can also be wound transversely to the peripheral surface.

An advantageous embodiment provides outward and return guides which are arranged over a length of 70 cm, for example, in the case of a cylindrical peripheral surface. By way of example, 70 outward and return guides/strand spacing are possible. With a strand spacing of 5 cm, for example, 14 outward and return guides are arranged transversely to the peripheral surface. In this case, the secondary side must also be designed to be rotated about 90°.

Figure 4:
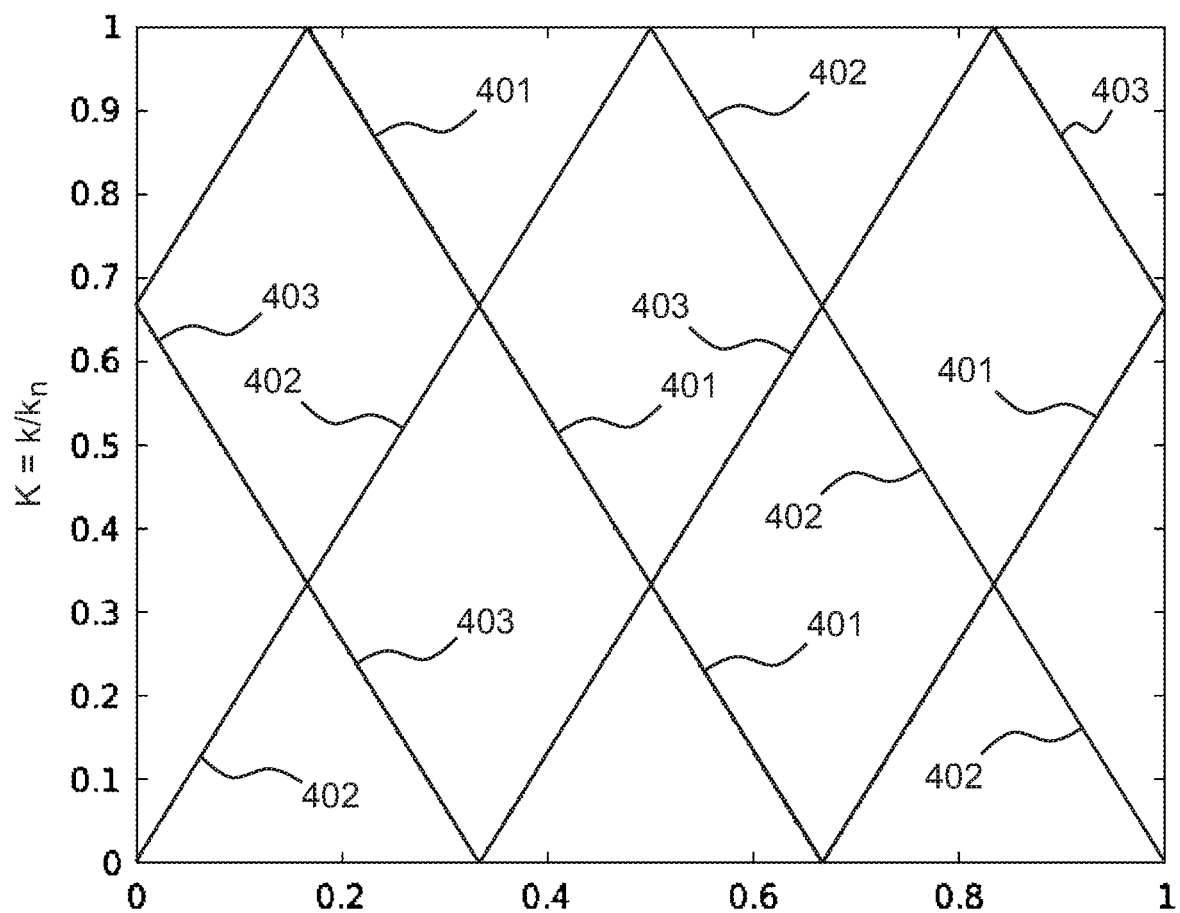
FIG. 4 shows the coupling factor via a pole for each of the three secondary-sided windings depicted in FIG. 3.

FIG. 4 schematically shows the coupling factor via a pole, i.e. the part of a rotation where the pattern is repeated for each of the three secondary-sided windings 210 or 310, 220 or 320, 230 or 330 respectively. It can clearly be seen that, in a rotation for each winding, there are maxima and minima depending on the overlap (see FIG. 1). If the windings are combined, there is, for example, a minimal coupling factor of 70 percent of the nominal coupling factor. This value is taken into account when designing the system. The system design is inherently known.

By way of example, it arises from the disclosure:

David Maier, Jörg Heinrich, Marco Zimmer, Marcel Maier, Nejila Parspour Contribution to the System Design of Contactless Energy Transfer Systems, IEEE Transactions on Industry Applications, Vol. 55, No. 1, January/February 2019 (https://ieeexplore.ieee.org/document/8440726).

Figure 5:
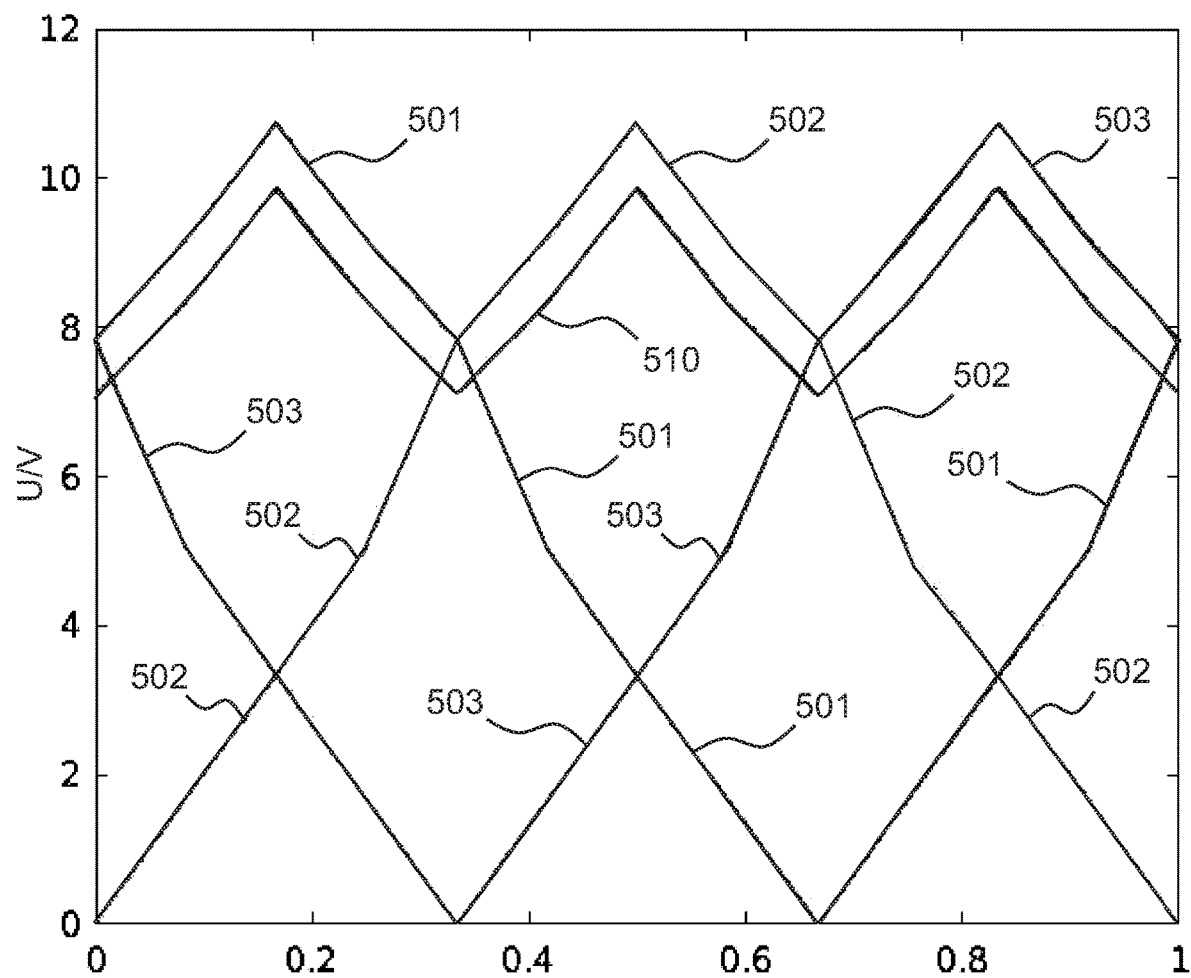
FIG. 5 shows the voltage via a pole with a couple factor depicted in FIG. 4.

In FIG. 5, the output voltage via a pole is depicted. The output voltages of the three windings are respectively depicted, wherein the output voltage 501 corresponds to the winding (inductivity) 210 or 310, the output voltage 502 corresponds to the winding 220 or 320 and the output voltage 503 corresponds to the winding 230 or 330. 510 shows the combined output voltage when the circuit depicted in FIG. 3 is used. The voltage level is dependent on the number of windings or the design of the coils which the inductivities on the primary and secondary sides form. It is basically variable dependent on these sizes.

The above description shows that a reliable energy supply on an inductive path from secondary-sided recipients arranged on a rod is possible in the case of simultaneously arbitrary ability to move on the rod and in the case of any rotational freedom in the arrangement of the recipients.

Although only a few embodiments of the present invention have been shown and described, it is to be understood that many changes and modifications may be made thereunto without departing from the spirit and scope of the invention.

What is claimed is:

1. A device for inductively transferring electrical energy and/or data from a primary-sided carrier to at least one secondary-sided recipient which can be positioned on the carrier, comprising a meander-shaped winding on the primary side and at least one meander-shaped winding on the secondary side, wherein a plurality of meander-shaped windings are arranged offset to one another and mutually overlapping on the secondary side.

2. The device according to claim 1, wherein a compensation and rectifier circuit is assigned to every meander-shaped winding.

3. The device according to claim 2, wherein all compensation and rectifier circuits are assigned to a single intermediate circuit.

\* \* \* \* \*